United States Patent
Ao et al.

(10) Patent No.: US 12,412,905 B2
(45) Date of Patent: Sep. 9, 2025

(54) MULTIFUNCTIONAL MIXED OXIDE ELECTROCATALYST MATERIAL AND PREPARATION METHOD AND USE THEREOF

(71) Applicant: SINOHYKEY TECHNOLOGY GUANGZHOU CO. LTD., Guangdong (CN)

(72) Inventors: Hongliang Ao, Guangdong (CN); Yunsong Yang, Guangdong (CN); Yun Cai, Guangdong (CN); Siyu Ye, Guangdong (CN); Yuquan Zou, Guangdong (CN); Junke Tang, Guangdong (CN); Ning Sun, Guangdong (CN)

(73) Assignee: SINOHYKEY TECHNOLOGY GUANGZHOU CO. LTD, Guangzhou (CN)

( * ) Notice: Subject to any disclaimer, the term of this patent is extended or adjusted under 35 U.S.C. 154(b) by 345 days.

(21) Appl. No.: 17/939,354

(22) Filed: Sep. 7, 2022

(65) Prior Publication Data
US 2024/0079604 A1    Mar. 7, 2024

(51) Int. Cl.
*H01M 4/86* (2006.01)
*H01M 4/90* (2006.01)
*H01M 8/1004* (2016.01)

(52) U.S. Cl.
CPC ....... *H01M 4/8652* (2013.01); *H01M 4/9016* (2013.01); *H01M 8/1004* (2013.01)

(58) Field of Classification Search
CPC ............ H01M 4/8652; H01M 4/9016; H01M 8/1004; H01M 2008/1095; H01M 2008/1293
See application file for complete search history.

(56) References Cited

U.S. PATENT DOCUMENTS

| 2006/0258527 A1 | 11/2006 | Yoo et al. |
| 2007/0212593 A1 | 9/2007 | Raiford et al. |
| 2012/0045704 A1 | 2/2012 | Choudhury |

(Continued)

FOREIGN PATENT DOCUMENTS

| CN | 110433803 A | 11/2019 |
| CN | 111868307 A | 10/2020 |

(Continued)

OTHER PUBLICATIONS

Galani et al., Development of RuO2/CeO2 heterostructure as an efficient OER electrocatalyst for alkaline water splitting, International Journal of Hydrogen Energy, Sep. 14, 2019, pp. 18635-18644, vol. 45, Issue 37, 2020, (Year: 2020).*

(Continued)

*Primary Examiner* — Daniel S Gatewood
(74) *Attorney, Agent, or Firm* — MUNCY, GEISSLER, OLDS & LOWE, P.C.

(57) ABSTRACT

A multifunctional mixed oxide electrocatalyst material including a metal oxide A with oxygen storage capacity and a metal oxide B with oxygen evolution reaction is prepared by two-steps hydrothermal reactions. The electrocatalyst material is a good free radical scavenger, oxygen evolution reagent and able to alleviate carbon monoxide poisoning on catalyst, when it is applied in a membrane electrode assembly for fuel cells.

13 Claims, 1 Drawing Sheet

(56) References Cited

U.S. PATENT DOCUMENTS

2014/0322631 A1 10/2014 Klose-Schubert et al.
2017/0033369 A1 2/2017 Burton et al.
2021/0013519 A1* 1/2021 Bashyam .............. H01M 4/921

FOREIGN PATENT DOCUMENTS

CN 113363512 A * 9/2021
KR 20050089324 A * 9/2005

OTHER PUBLICATIONS

Sunil M. Galani, et al., Development of RuO2/CeO2 heterostructure as an efficient OER electrocatalyst for alkaline water splitting, International Journal of Hydrogen Energy, Sep. 14, 2019, pp. 18635-18644, vol. 45, Issue 37, 2020, ISSN 0360-3199, https://doi.org/10.1016/j.ijhydene.2019.08.026.

* cited by examiner

MULTIFUNCTIONAL MIXED OXIDE ELECTROCATALYST MATERIAL AND PREPARATION METHOD AND USE THEREOF

TECHNICAL FIELD

The present invention relates to the technical field of electrocatalyst materials, and more particularly, relates to a multifunctional mixed oxide electrocatalyst material, and a preparation method and use thereof in membrane electrode assembly for fuel cells.

BACKGROUND

A fuel cell is an energy conversion device, which directly converts the chemical energy in fuel (such as hydrogen) and oxidant (such as oxygen or air) into electrical energy and thermal energy by electrochemical reaction. Such energy conversion has advantages of high conversion efficiency and environmental protection. Therefore, the fuel cell is widely applied in various fields such as aerospace, military submarines, transportation, portable electronic equipment, and stationary power stations. It is thus beneficial for alleviating energy crisis and reducing the emission of pollutants when the fuel is hydrogen prepared from renewable clean energy.

Proton exchange membrane fuel cells (PEMFCs) generally employ a proton conducting polymer membrane electrolyte between two electrodes, namely a cathode and an anode. A structure comprising a proton conducting polymer electrolyte sandwiched between two electrodes is known as a membrane electrode assembly (MEA). MEA is the most critical component of PEMFCs. The catalyst layers contain a catalyst material for the electrochemical reaction where chemical energy is converted into electrical energy. At present, noble metal nanoparticles, mainly platinum, with carbon support are used as catalyst in fuel cells. Generally, a single cell is formed by the membrane electrode assembly with frame material. However, due to limited power a single fuel cell can provide, a certain number of fuel cells are usually assembled together to form a stack to achieve sufficient power output.

MEA durability is one of the most important issues for the development of PEMFCs. However, in practical working condition, especially in transportation application, several issues can cause MEA degradation, and shorten MEA lifetime. These include (1) cell reversal of MEA; (2) chemical degradation of proton exchange membrane and ionomer in catalyst layer; (3) poisoning of fuel cell catalyst.

Cell reversal, which would create irreversible damage to the fuel cell and shorten its lifespan, is caused by reactant starvation, load changes, low catalyst performance, and so on. MEA will experience frequent start-up, shut-down and load changes in standard fuel cell operating conditions, which may lead to cell reversal of the fuel cell, resulting in corrosion of carbon support in the catalyst layers of the fuel cell. The corrosion of carbon support in turn causes loss of catalyst and collapse of the catalyst layer, thereby causing MEA performance degradation. Hydrophobicity and porosity of the catalyst layer may also be changed, which further reduces performance of the fuel cell. Furthermore, long time cell reversal will also cause oxidation and degradation of gas diffusion layer (GDL) and proton exchange membrane, which can cause open circuit voltage (OCV) drop or even a short circuit. All these will result in failure of the fuel cell stack.

Hydrogen peroxide can be formed either at Pt supported on carbon black in the catalyst layers or during the oxygen reduction reaction. Hydrogen peroxide will react with impurities (such as $Fe^{2+}$) in a Fenton type reaction to generate free radicals such as hydroxyl radicals (•OH), or hydroperoxyl radicals (•OOH), which will attack proton exchange membrane and ionomer in catalyst layer on weak groups (such as a carboxylic acid group) to cause chemical degradation thereof, resulting in performance drop and even failure of the proton exchange membrane and ionomer. Ultimately, the performance and lifetime of the fuel cell stack is reduced.

In PEMFCs, pure hydrogen is used as fuel for the anode. However, hydrogen is mainly converted from fossil fuels such as natural gas, coal and petroleum, and may contain a certain amount of carbon monoxide. In some cases, about 10 ppm carbon monoxide can still exist even after multi-steps purification. Trace of carbon monoxide at ppm level can lead to loss of the anode platinum catalyst active site, and significantly reduce the output power and efficiency of the fuel cell.

Accordingly, the above issues (cell reversal, free radical attack and CO poisoning catalyst) can significantly affect the performance and lifetime of the fuel cell stack, which can obstruct its pathway to commercialization.

In order to overcome cell reversal of MEA, oxygen evolution reaction catalyst (OER), such as iridium oxide or ruthenium oxide, are used in the anode catalyst layer. OER catalyst can prevent carbon support from corrosion by promoting electrolysis of water during cell reversal. Johnson Matthey (UK) and Ballard Power Systems Inc. (Canada), for example, have multiple inventions employing catalyst layer with OER catalyst, and membrane electrode assembly, and fuel cells including the catalyst layer and the membrane electrode assembly. US20170033369A1 discloses a catalyst layer including: (i) a platinum-containing electrocatalyst; (ii) an oxygen evolution reaction electrocatalyst; (iii) one or more carbonaceous materials; and (iv) a proton-conducting polymer and its use in an electrochemical device. The oxygen reaction catalyst may comprise ruthenium or ruthenium oxide or iridium or iridium oxide or mixtures, iridium or iridium oxide and one or more metals M or an oxide thereof. M is a transition metal (tantalum, titanium, zirconium, hafnium, niobium) or tin. The catalyst layer is more resistant to oxidative corrosion.

To improve chemical stability of the proton exchange membrane and ionomer, additives have been applied in the MEA. For example, US20070212593A1 and US20120045704A1 disclose a stable proton exchange membrane and a membrane electrode assembly respectively, chemical stability of the proton exchange membrane is significantly improved by adding free radical scavengers to the proton exchange membrane. Most used free radical scavengers contain various metal ions such as $Ce^{3+}$, $Ce^{4+}$, $Mn^{2+}$, $Mn^{4+}$, $Co^{2+}$, $Co^{3+}$ and metal oxides such as $CeO_2$, $MnO_2$, $Mn_2O_3$, $CoO$, $CoO_2$, $TiO_2$, $Fe_2O_3$, $FeO$.

Alloy catalysts of platinum with other metals and metal oxides additives have been studied to increase the CO poisoning tolerance capability of electrochemical catalyst for PEMFCs either by promoting oxidation of CO (metal oxide additives) or by weakening adsorption strength of CO through a difunctional mechanism or ligand effect (alloy catalysts). Alloy catalysts include bimetallic catalysts with carbon support such as PtRu/C, PtNi/C, PtIr/C and PtSn/C. Metal oxide additives include $CeO_2$, $FeO_x$ and $WO_x$. For example, US20060258527A1 discloses a $PtAu-M_xO_y/C$-loaded catalyst with good carbon monoxide poisoning tolerance capability.

Performance and lifetime of PEMFCs are significantly impacted by reversal tolerance capability of the catalyst layer, chemical stability of the proton exchange membrane and ionomer, carbon monoxide poisoning tolerance capability of the catalyst layer. So far, there isn't a simple solution to solve all these issues. It is still necessary to find solution to solve or alleviate the above-mentioned three problems simultaneously.

In response to the above problems, US20210013519A1 and the related CN111868307A disclose a membrane electrode assembly containing an iridium-containing metal oxide supported on a cerium oxide support, which can improve lifetime and stability of MEA. However, synthesis of the iridium-containing metal oxide supported on a cerium oxide support is difficult and complicated, because in case that iridium-containing metal oxide isn't supported on the cerium oxide support, addition of pure cerium oxide additive to the MEA can cause MEA performance drop.

SUMMARY

The present invention thus provides a multifunctional mixed oxide electrocatalyst material, and a preparation method and its application in MEA thereof, which can overcome the aforesaid drawbacks. The multifunctional mixed oxide electrocatalyst is a good free radical scavenger, has both high carbon monoxide poisoning tolerance capability and high cell reversal tolerance capability.

According to one aspect, a multifunctional mixed oxide electrocatalyst material is provided, which includes a metal oxide A with an oxygen storage capacity and a metal oxide B with catalyst activity for an oxygen evolution reaction.

The multifunctional electrocatalyst material according to the present invention is used as a catalyst in a hydrogen-oxygen fuel cell, which includes the metal oxide A with the oxygen storage capacity and the metal oxide B with the catalyst activity for the oxygen evolution reaction. The oxide A with the oxygen storage capacity has the capability of capturing free radicals and reducing carbon monoxide poisoning to fuel cell catalyst. The oxide B with the catalyst activity for the oxygen evolution reaction has the capability to electrolyze water, which can reduce the damage to the catalyst layer and other components of the fuel cell caused by cell reversal. The synergistic effect of the metal oxide A with the oxygen storage capacity and the metal oxide B with the catalyst activity for the oxygen evolution reaction thus can alleviate the poisoning of carbon monoxide on the catalyst, prevent the damage to a proton exchange membrane and ionomer from free radicals attack, and provide protection for a carbon support and the catalyst layer by electrolyzing water when the fuel cell stack is in cell reversal. Hence, the multifunctional electrocatalyst can improve the stability of MEA during fuel cell operation.

The metal forms covalent bond with oxygen in the multifunctional electrocatalyst material. The active site is cation ion in the catalyst, which is more active than metal element. In addition, the present invention is a non-supported catalyst, and the non-supported catalyst is applied in the catalyst layer as an additive, so that the impact of the non-supported catalyst on other components in the catalyst layer is ignorable compared to that of a supported catalyst due to its low weight or volume fraction.

According to the present invention, the metal oxide A is a cerium containing oxide and the metal oxide B is an iridium containing oxide, ruthenium containing oxide, or iridium and ruthenium containing oxide.

Preferably, the metal oxide A is one or a mixture of ceria, cerium sesquioxide, doped ceria and doped cerium sesquioxide, and/or the metal oxide B is one or a mixture of iridium oxide, ruthenium oxide and ruthenium and iridium oxide.

According to the present invention, the mass fraction of the metal oxide B is 20-90%.

Preferably, the mass fraction of the metal oxide B in the electrocatalyst material is 40-70%. The optimal mass ratio between metal oxide A and metal oxide B will balance the capability of carbon monoxide poisoning tolerance capability and free radicals scavenger capability against the reversal tolerance capability.

According to the present invention, a doping element in the doped ceria and the doped cerium sesquioxide is one or more of transition metal elements or lanthanide metal elements.

The doping of the transition metal elements or the lanthanide metal elements will further improve stability of oxide A with the oxygen storage capacity, as well as free radical scavenger capacity and carbon monoxide poisoning tolerance capability.

Preferably, the doping element in the doped ceria and the doped cerium sesquioxide is one or more of Mn, Cu, Ti, Pr, Gd and Zr.

According to the present invention, the doping element in the doped ceria and the doped cerium sesquioxide is one or more of Pr, Gd and Zr.

More preferably, the atomic mass of the doping element in the doped ceria and the doped cerium sesquioxide is 1-20% of the atomic mass of cerium.

According to another aspect, a method for preparing the above-mentioned multifunctional mixed oxide electrocatalyst material is provided, which includes the following steps. A cerium-containing water-soluble precursor, or a cerium and a doping element-containing water-soluble precursor are dissolved and treated with hydrothermal reaction, and then the obtained material is washed and dried. An iridium-containing water-soluble precursor, or a ruthenium-containing water-soluble precursor, or a ruthenium-containing and an iridium-containing water-soluble precursors is then added, mixed uniformly, and treated with second hydrothermal reaction. The precipitate is first filtered and washed. Then the precipitate is further dried and calcined to obtain the multifunctional mixed oxide electrocatalyst material.

Preparation of the electrocatalyst material of the present invention includes a two-steps hydrothermal reactions. Hydroxide of cerium is prepared in the first hydrothermal reaction. In the second hydrothermal reaction, cerium ions released from the hydroxide of cerium and iridium ions react with hydroxide in an alkaline environment as co-homogeneous nucleation to form an "atomic level" or "molecular level" mixed $CeO_x$—$IrO_2$ amorphous compound. In the following heat treatment, the hydroxide of cerium and hydroxide of iridium are dehydrated to form oxides, in which "self-condensation dehydration" process of iridium hydroxide and cerium hydroxide and "co-dehydration condensation" process between iridium hydroxide and cerium hydroxide are involved, which forms an iridium-oxygen-cerium bonding structure, further promoting uniform mixing of cerium and iridium. An amorphous and crystalline multi-phase nanomaterial is formed after heat treatment, which has both good stability and high activity. Thus, a catalyst prepared by the two-steps hydrothermal reaction has better dispersity and higher uniformity than a catalyst prepared by a one-step hydrothermal reaction.

According to the present invention, specific steps are as follows.
- S1: dissolving the cerium-containing water-soluble precursor, and/or the cerium and doping element-containing water-soluble precursor in water to form a solution, then mixing the solution with an aqueous solution of an alkali metal hydroxide of a certain concentration in a Teflon reactor to form a homogeneous solution;
- S2: placing the reactor in S1 in an oven to heat at 100-180° C. for 12-24 h to obtain a hydroxide product, after the hydrothermal reaction is completed, washing and filtering the obtained hydroxide product with water and ethanol for 2-5 times, and then drying the product in the oven;
- S3: adding the product dried in S2 into another alkali metal hydroxide solution of a certain concentration and mixing uniformly, then adding the iridium-containing water-soluble precursor or the ruthenium-containing water-soluble precursor or the ruthenium and iridium-containing water-soluble precursors, and after mixing, transferring into another Teflon reactor to form a homogeneous solution;
- S4: placing the reactor in S3 in an oven to heat at 100-150° C. for 12-24 h to obtain another product, the precipitate was filtered and washed, and dried in oven, and then calcined at 300-800° C. for 2-4 h to obtain the multifunctional mixed oxide electrocatalyst material.

According to the present invention, the water-soluble precursor of cerium is selected from one or more of cerium nitrate, cerium chloride and cerium acetate, the water-soluble precursor of iridium is selected from one or more of iridium trichloride, iridium tetrachloride, hydrogen hexachloroiridate hexahydrate and sodium hexachloroiridate hexahydrate, and the alkali metal hydroxide is either sodium hydroxide or potassium hydroxide, or mixture of them.

According to another aspect, the above-mentioned multifunctional mixed oxide electrocatalyst material can be used in MEA, and MEAs can be assembled with plates for a fuel cell stack.

The present invention has advantages over the prior art. The multifunctional electrocatalyst material according to the present invention includes the metal oxide A with the oxygen storage capacity and the metal oxide B with the catalyst activity for the oxygen evolution reaction, which can improve reversal tolerance capability, chemical stability of proton exchange membrane and ionomer, carbon monoxide poisoning tolerance capability at the same time. Therefore, the performance and lifetime of MEAs are improved.

The transition metal element or lanthanide metal element doped in metal oxide A can further increase free radical scavenger capability, and carbon monoxide poisoning tolerance capability of the electrochemical catalyst material.

In addition, the multifunctional electrocatalyst material according to the present invention is prepared by a two-steps hydrothermal reaction. The dispersity as well as the homogeneity of the material prepared by the two-steps reaction is superior to that of a material prepared by a one-step hydrothermal method.

DETAILED DESCRIPTION

Figure 1:
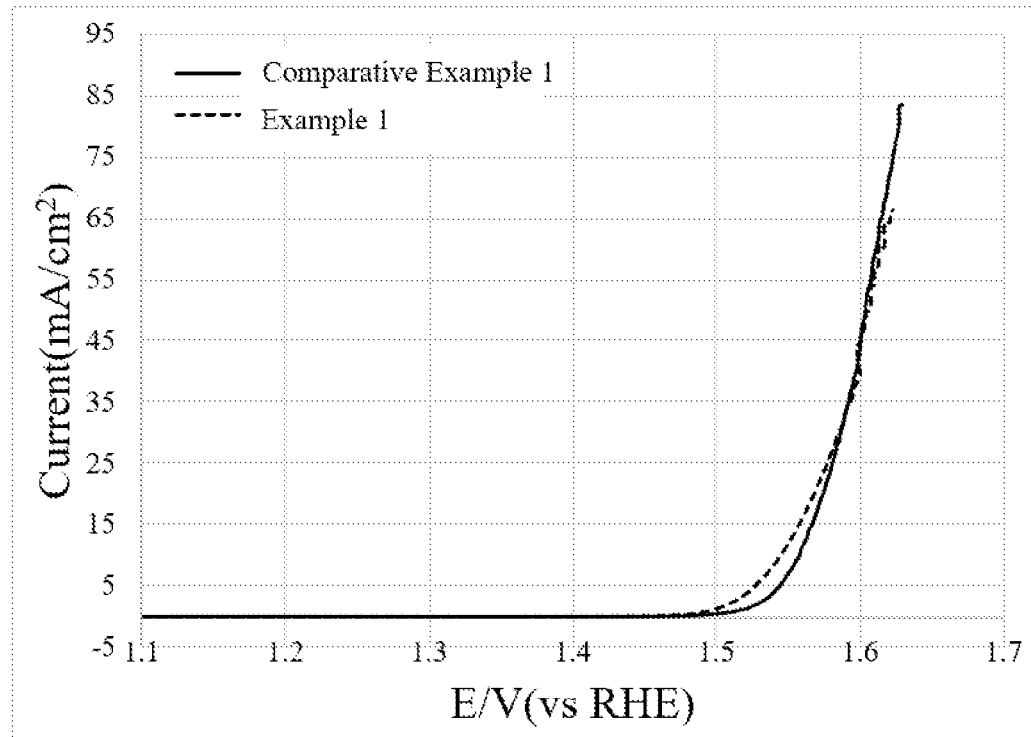
FIG. 1 is a linear sweep voltammetry of Example 1 according to the present invention and Comparative Example 1 (pure iridium oxide SA100 electrocatalyst material of Tanaka) in 0.5M $H_2SO_4$.

The embodiments of the present invention are only used for illustrative description, and should not be construed as a limitation to the present invention.

Example 1

The preparation of a multifunctional mixed oxide electrocatalyst material according to the present embodiment is described as follows.

0.868 g of $Ce(NO_3)_3 \cdot 6H_2O$ was dissolved in 5 mL water, and 0.21 g of NaOH was dissolved in 35 mL water. The two solutions obtained were mixed in a Teflon reactor and magnetically stirred for 30 min. The reactor was then placed in an oven to heat at 100° C. for 24 h. A hydroxide product was obtained after the hydrothermal reaction in the reactor was completed. The product was washed and filtered with water and ethanol for 3 times, and then was dried in oven at 60° C. for about 30 min. 30 mg of the dried hydroxide product was weighed and added into 20 mL of 0.1M NaOH solution to obtain a mixture. The mixture was subjected to ultrasonic processing for at least 30 min to ensure uniform mixing. 0.0735 g of $H_2IrCl_6 \cdot 6H_2O$ (35 wt % Ir) precursor was added to the mixture solution, which was then transferred into a 40 mL Teflon reactor and subjected to ultrasonic processing for approximately 10 min to form a homogeneous solution. The reactor was placed in the oven to heat at 150° C. for 720 min. The precipitate was filtered and washed two times, and then was dried at 60° C. for at least 30 min. The dry product was further calcined at 400° C. for 2 h to obtain a final product with iridium oxide content of 50%.

Example 2

The preparation of a multifunctional mixed oxide electrocatalyst material according to the present embodiment is described as follows.

0.868 g of $Ce(NO_3)_3 \cdot 6H_2O$ was dissolved in 5 mL water, and 0.21 g of NaOH was dissolved in 35 mL water. The two solutions obtained were mixed in a Teflon reactor and magnetically stirred for 30 min. The reactor was then placed in an oven to heat at 100° C. for 24 h. A product was obtained after the hydrothermal reaction in the reactor was completed. The product was washed and filtered with water and ethanol for 3 times, and then was dried in the oven at 60° C. for about 30 min. 30 mg of the dried product was weighed and added into 20 mL of 0.1M NaOH solution to obtain a mixture. The mixture was subjected to ultrasonic processing for at least 30 min to ensure uniform mixing. 0.0558 g of $H_2IrCl_6 \cdot 6H_2O$ (35 wt % Ir) precursor was added to the mixture solution, which was then transferred into a 40 mL Teflon reactor and subjected to ultrasonic processing for approximately 10 min to form a homogeneous solution. The reactor was placed in the oven to heat at 150° C. for 720 min. The precipitate was filtered and washed two times, and then was dried at 60° C. for at least 30 min. The dry product was further calcined at 400° C. for 2 h to obtain a final product with iridium oxide content of 40%.

Example 3

The preparation of a multifunctional mixed oxide electrocatalyst material according to the present embodiment is described as follows.

0.868 g of $Ce(NO_3)_3 \cdot 6H_2O$ was dissolved in 5 mL water, and 0.21 g of NaOH was dissolved in 35 mL water. The two solutions obtained were mixed in a Teflon reactor and magnetically stirred for 30 min. The reactor was then placed in an oven to heat at 100° C. for 24 h. A product was obtained after the hydrothermal reaction was completed. The product was washed and filtered with water and ethanol for 3 times, and then dried in the oven at 60° C. for about 30 min. 30 mg of the dried product was weighed and added into 20 mL of 0.1M NaOH solution to obtain a mixture. The mixture was subjected to ultrasonic processing for at least 30 min to ensure uniform mixing. 0.0882 g of $H_2IrCl_6 \cdot 6H_2O$ (35 wt % Ir) precursor was added to the mixture solution, which was then transferred into a 40 mL Teflon reactor and subjected to ultrasonic processing for approximately 10 min to form a homogeneous solution. The reactor was placed in the oven to heat at 150° C. for 720 min. The precipitate was filtered and washed two times, and then was dried at 60° C. for at least 30 min and the dry product was further calcined at 400° C. for 2 h to obtain a final product with iridium oxide content of 60%.

Example 4

The preparation of a multifunctional mixed oxide electrocatalyst material according to the present embodiment is described as follows.

0.868 g of $Ce(NO_3)_3 \cdot 6H_2O$ and 0.162 g of $Zr(NO_3)_4$ were dissolved in 5 mL water, and 0.21 g of NaOH was dissolved in 35 mL water. The two solutions obtained were mixed in a Teflon reactor and magnetically stirred for 30 min. The reactor was then placed in an oven to heat at 100° C. for 24 h. A product was obtained after the hydrothermal reaction in the reactor was completed. The product was washed and filtered with water and ethanol for 3 times, and then dried in the oven at 60° C. for about 30 min, and 10% zirconium-doped cerium oxide was obtained. 30 mg of the dried product was weighed and added into 20 mL of 0.1M NaOH solution to obtain a mixture. The mixture was subjected to ultrasonic processing for at least 30 min to ensure uniform mixing. 0.0735 g of $H_2IrCl_6 \cdot 6H_2O$ (35 wt % Ir) precursor was added to the mixture solution, which was then transferred into a 40 mL Teflon reactor and subjected to ultrasonic processing for approximately 10 min to form a homogeneous solution. The reactor was placed in the oven to heat at 150° C. for 720 min. The precipitate was filtered and washed two times, and then was dried at 60° C. for at least 30 min. The dry product was further calcined at 400° C. for 2 h to obtain a final product with iridium oxide content of 50%.

Oxygen evolution reaction capability was evaluated for the multifunctional mixed oxide electrocatalyst material obtained from the embodiments above.

Reversal tolerance capability of the catalyst material is due to that the catalyst material electrolyze water to prevent corrosion of carbon support in the catalyst. The water electrolysis performance of the catalyst material is therefore associated with its reversal tolerance capability. Overpotential of the oxygen evolution reaction in water electrolysis is used to determine catalyst activity in water electrolysis. Generally, the higher the activity of the oxygen evolution reaction of the catalyst material (the lower the overpotential), the higher the catalyst capability to electrolyze water, and therefore the reversal tolerance capacity of the material is higher. Accordingly, overpotential of oxygen evolution reaction is determined to evaluate reversal tolerance capability of the catalyst material.

The catalyst material prepared in Examples 1~4 was dissolved in a mixed solution of water and isopropanol, respectively. A certain amount of Nafion® solution was added, and was dispersed by ultrasound to obtain a uniformly dispersed slurry. A certain amount of the slurry was added onto a rotating disk gold electrode to prepare a working electrode. The loading amount of metal iridium on the surface of the electrode is 0.099 mg Ir/cm².

The electrode was dried and then conducted for linear sweep voltammetry measurement in a nitrogen-saturated 0.5M $H_2SO_4$ electrolyte through a three-electrode system, in which a reference electrode was a mercury-mercurous sulfate electrode, a counter electrode was a platinum plate electrode, and a sweep rate is 5 mV/s. The results are shown as Example 1 in FIG. 1, from which the overpotential of the prepared catalyst of Example 1 was 315 mV at a current density of 10 mA/cm². As a comparison, a commercial reversal tolerance iridium oxide catalyst (iridium oxide content of 100%) was applied as Comparative Example 1 in FIG. 1. Overpotential of the commercial iridium oxide catalyst of Comparative Example 1 was 329 mV at a current density of 10 mA/cm 2. Therefore, the catalyst prepared in Example 1 was significantly better than the commercial iridium oxide catalyst in terms of oxygen evolution reaction.

For the test result of the oxygen evolution reaction in Examples 1 to 4, it was found that reversal tolerance capability increases with increasing of iridium oxide content, while the capability of carbon monoxide tolerance capability and free radicals scavenger capability decrease with increasing of iridium oxide. The content of iridium oxide is preferably 40-70%. After doped with other transition metal or lanthanide metal element in cerium oxide, the stability of catalyst material can be improved. Furthermore, reversal tolerance capability, free radical scavenger capability and carbon monoxide poisoning tolerance capability of catalyst have also been increased.

Fenton reaction experiments were also conducted to evaluate the free radical scavenger capability of catalyst.

As described above, hydrogen peroxide can be formed either at Pt supported on carbon black in the catalyst layers or during the oxygen reduction reaction. Hydrogen peroxide will react with impurities (such as $Fe^{2+}$) in a Fenton type reaction to generate free radicals such as hydroxyl radicals (•OH), or hydroperoxyl radicals (•OOH), which will attack proton exchange membrane and ionomer in catalyst layer on weak groups (such as a carboxylic acid group) to cause chemical degradation. Degradation of proton exchange membrane and ionomer caused by free radicals can be mitigated by adding free radical scavenger additive. Therefore, the free radical scavenger capability of the catalyst material can be evaluated with Fenton reaction experiment.

Specifically, ferrous sulfate and a hydrogen peroxide solution were used to prepare a Fenton reagent with the 5% mass fraction of hydrogen peroxide and 5 ppm of $Fe^{2+}$. Three pieces of 4*5 cm Nafion® 211 proton exchange membranes were prepared. Each proton exchange membrane was immersed in 100 mL Fenton solution in a flask. 5 mg of the multifunctional electrocatalyst prepared in Example 1 was added as additive in the first test. 5 mg 20 nm commercial ceria (ceria content of 100%) of Comparative Example 2 was added as additive in the second test. No additive is used in the third test for blank control. The three test solutions were heated at 80° C. for 6 hours with stirring.

Figure 2:
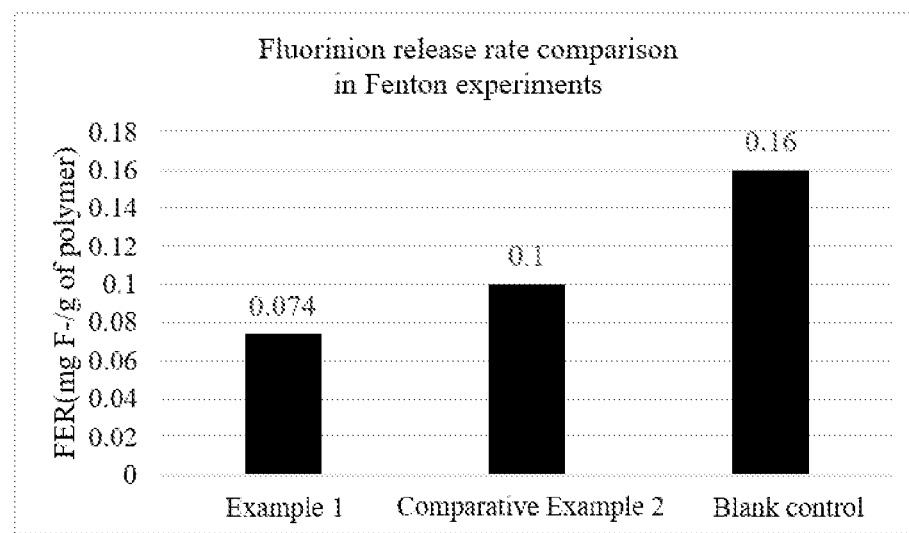
FIG. 2 is a graph comparing fluorine ion release rates in Fenton reaction experiments of Example 1 according to the present invention, Comparative Example 2 (20 nm ceria (C804512, 99.5%) catalyst material of Macklin) and a blank sample.

After six hours, the solutions were cooled down to room temperature, 30 mL of each solution was mixed with 30 mL of TISAB buffer solution, respectively. Fluorine ion content was measured with a fluorine ion electrode to determine the fluorine ion release rate for each test. The results are shown in FIG. 2, it can be seen that the fluorine ion release rate is 0.16 mg $F^-$/g polymer in the experiment without additive. In Comparative Example 2, the fluorine ion release rate is 0.1 mg $F^-$/g polymer, while the fluorine ion release rate in the experiment of the multifunctional electrocatalyst material in Example 1 is 0.074 mg $F^-$/g polymer, lower than those in the tests with commercial ceria additive and without additive, which indicates the electrocatalyst in Example 1 is a better free radical scavenger than the commercial ceria.

Compared with the catalyst material prepared in Example 1 containing 50% iridium oxide, the content of iridium oxide in Example 2 is reduced, while the content of cerium oxide is increased. The free radical scavenger capability is mainly based on the cerium oxide, so that the catalyst material prepared in Example 2 has a lower fluorine ion release rate in the Fenton experiment. The catalyst material prepared in Example 3 has a relatively low content of cerium oxide, and the fluorine ion release rate thereof in the Fenton experiment is higher than that of the catalyst material in Example 1, but lower than that of the catalyst material in Comparative Example 2. The catalyst material prepared in Example 4 has the lowest fluorine ion release rate among the catalyst materials prepared in Examples 1-4, because the free radical scavenger property of cerium oxide is improved due to the doping of a Zr element. Specifically, the order of the fluorine ion release rate is: Example 4<Example 2<Example 1<Example 3<Comparative Example 2.

Obviously, the above-mentioned embodiments of the present invention are only examples for clearly illustrating the technical solutions of the present invention, and are not intended to limit the specific embodiments of the present invention. Any modifications, equivalent replacements and improvements made within the spirit and principle of the claims of the present invention shall be included within the protection scope of the claims of the present invention.

The invention claimed is:

1. A preparation method for a multifunctional mixed oxide electrocatalyst material, comprising:
   dissolving a cerium-containing water-soluble precursor, or a cerium and a doping element-containing water-soluble precursor, heat treating with first hydrothermal reaction, and then filtering, washing and drying;
   adding an iridium-containing water-soluble precursor or a ruthenium-containing water-soluble precursor or a ruthenium and iridium-containing water-soluble precursors, mixing uniformly, and heat treating with second hydrothermal reaction; and
   filtering and washing a material obtained in the second hydrothermal reaction to obtain a precipitate, then drying and calcining the precipitate to obtain the multifunctional mixed oxide electrocatalyst material.

2. The preparation method according to claim 1, comprising steps as follows:
   S1) dissolving the cerium-containing water-soluble precursor or the cerium and doping element-containing water-soluble precursor in water to form a solution, then mixing the solution with an aqueous solution of an alkali metal hydroxide of a certain concentration in a Teflon reactor to form a homogeneous solution;
   S2) placing the reactor in S1 in an oven to heat at 100-180° C. for 12-24 h to obtain a hydroxide product, after the hydrothermal reaction is completed, washing and filtering the hydroxide product obtained with water and ethanol for 2-5 times, and then drying the product in the oven;
   S3) adding the product dried in S2 into another alkali metal hydroxide solution of a certain concentration and mixing uniformly, then adding the iridium-containing water-soluble precursor or the ruthenium-containing water-soluble precursor or the ruthenium and iridium-containing water-soluble precursor, and after mixing, transferring into another Teflon reactor to form another homogeneous solution; and
   S4) placing the reactor in S3 in another oven to heat at 100-150° C. for 12-24 h to obtain another product, then filtering and washing to obtain a precipitate, drying the precipitate in the oven, and then calcining at 300-800° C. for 2-4 h to obtain the multifunctional mixed oxide electrocatalyst material.

3. The preparation method according to claim 1, wherein the cerium-containing water-soluble precursor is selected from at least one of cerium nitrate, cerium chloride and cerium acetate.

4. The preparation method according to claim 1, wherein the iridium-containing water-soluble precursor is selected from at least one of iridium trichloride, iridium tetrachloride, hydrogen hexachloroiridate hexahydrate and sodium hexachloroiridate hexahydrate.

5. The preparation method according to claim 2, wherein the alkali metal hydroxide is sodium hydroxide or potassium hydroxide, or mixture thereof.

6. A use of the multifunctional mixed oxide electrocatalyst material manufactured according to claim 1 in a membrane electrode assembly used to form a fuel cell stack.

7. A multifunctional mixed oxide electrocatalyst material manufactured according to claim 1, comprising a metal oxide A with oxygen storage capacity and a metal oxide B with catalyst activity for oxygen evolution reaction.

8. The multifunctional mixed oxide electrocatalyst material according to claim 7, wherein the metal oxide A is a cerium containing oxide and the metal oxide B is an iridium containing oxide, ruthenium containing oxide, or iridium and ruthenium containing oxide.

9. The multifunctional mixed oxide electrocatalyst material according to claim 7, wherein the metal oxide A includes at least one of ceria, cerium sesquioxide, doped ceria and doped cerium sesquioxide; or the metal oxide B includes at least one of iridium oxide, ruthenium oxide, and iridium and ruthenium mixed oxide.

10. The multifunctional mixed oxide electrocatalyst material according to claim 7, wherein a mass fraction of the metal oxide B is 20-90%.

11. The multifunctional mixed oxide electrocatalyst material according to claim 9, wherein a doping element in the doped ceria and the doped cerium sesquioxide is at least one of transition metal elements or lanthanide metal elements.

12. The multifunctional mixed oxide electrocatalyst material according to claim 11, wherein the doping element in the doped ceria and the doped cerium sesquioxide is one or more of Mn, Cu, Ti, Pr, Gd and Zr.

13. The multifunctional mixed oxide electrocatalyst material according to claim 7, wherein an atomic mass of a doping element in the doped ceria and the doped cerium sesquioxide is 1-20% of an atomic mass of cerium.

* * * * *